United States Patent [19]

Lee

[11] Patent Number: 5,442,563
[45] Date of Patent: Aug. 15, 1995

[54] BACKWARD ASSEMBLY PLANNING WITH DFA ANALYSIS

[75] Inventor: Sukhan Lee, La Canada, Calif.

[73] Assignee: The United States of America as represented by the Adminstrator of the National Aeronautics and Space Administration, Washington, D.C.

[21] Appl. No.: 258,908

[22] Filed: Jun. 9, 1994

Related U.S. Application Data

[63] Continuation of Ser. No. 942,499, Aug. 28, 1992, abandoned.

[51] Int. Cl.⁶ ............................................. G06F 17/50
[52] U.S. Cl. ..................................... 364/468; 395/52
[58] Field of Search ............... 364/468, 478, 401, 402, 364/403, 578; 395/12, 52, 903, 912, 919, 920

[56] References Cited

PUBLICATIONS

R. J. Popplestone, A. P. Ambler, and I. M. Bellos, "An interpreter for a language for describing assemblies," Artifical Intelligence Journal, 1980, vol. 14, pp. 79–107.

L. S. Homem de Mello and A. C. Sanderson, "AND-/OR graph representation of assembly plans," IEEE Trans. Robotics Automat., Apr., 1990, vol. 6,No. 2, pp. 188–199.

S. Lee, "Disaasembly Planning by Subassembly Extraction," in the Proceedings of the Third ORSA/TIMS Conference on Flexible Manufacturing Systems, Aug., 1989, (Elsevier Science, MIT, Mass.), pp. 383–388.

S. Lee and Y. G. Shin, "Automatic Construction of Assembly Partial-Order Graph," in Proceedings of the 1988 International Conference on Computer Integrated Manufacturing, May, 1988, (RPI, Troy, New York), pp. 383–392.

T. L. De Fazio and D. E. Whitney, "Simplified Generation of All Mechanical Assembly Sequences," IEEE J. Robotics Automata, Dec., 1987, RA-3(6), pp. 640–658. Corrections ibid Dec., 1988, RA-4(6), pp. 705–708.

D. F. Baldwin et al., "An Integrated Computer Aid for Generating and Evaluating Assembly Sequences for Mechanical Products," IEEE J. Robotics and Automation, RA-7 vol. 1, Feb., 1991, pp. 78–94.

H. Ko and K. Lee, "Automatic assembling procedure generation from mating conditions," Computer Aidded Design, vol. 19, No. 1, pp. 3–10, Feb., 1987.

R. L. Hoffman, "Automated Assembly Planning for B-rep Products," in IEEE International Conference on systems Engineering, (Pittsburg, Pa.), Aug. 1990, pp. 391–394.

S. Lee and Y. G. Shin, "Assembly Planning Based on (List continued on next page.)

*Primary Examiner*—Roy N. Envall, Jr.
*Assistant Examiner*—Brian C. Oakes
*Attorney, Agent, or Firm*—John H. Kusmiss; Thomas H. Jones; Guy M. Miller

[57] ABSTRACT

An assembly planning system that operates based on a recursive decomposition of assembly into subassemblies, and analyzes assembly cost in terms of stability, directionality, and manipulability to guide the generation of preferred assembly plans. The planning in this system incorporates the special processes, such as cleaning, testing, labeling, etc. that must occur during the assembly, and handles nonreversible as well as reversible assembly tasks through backward assembly planning. In order to increase the planning efficiency, the system avoids the analysis of decompositions that do not correspond to feasible assembly tasks. This is achieved by grouping and merging those parts that can not be decomposable at the current stage of backward assembly planning due to the requirement of special processes and the constraint of interconnection feasibility. The invention includes methods of evaluating assembly cost in terms of the number of fixtures (or holding devices) and reorientations required for assembly, through the analysis of stability, directionality, and manipulability. All these factors are used in defining cost and heuristic functions for an AO* search for an optimal plan.

13 Claims, 6 Drawing Sheets

PUBLICATIONS

Geometric Reasoning," Computers and Graphics, an International Journal of Applications in Computer Graphics, 1990, vol. 14, No. 2, pp. 237–250.

Y. F. Huang and C. S. G. Lee, "An Automatic Assembly Planning System," Proceeding of the 1990 IEEE Conference on Robotics and Automation, (Cincinnati, Ohio), May, 1990, pp. 1594–1599.

A. A. G. Requicha, "Representations for rigid solids: Theory, methods and systems," ACM Computing Surveys, Dec., 1980, vol. 12, No. 4, pp. 437–464.

L. De Floriani and G. Nagy, "A graph-based model for face-to-face assembly," in Proceedings IEEE International Conference on Robotics and Automation, (Scottsdale, Ariz.), 1989, pp. 75–78.

F. Thomas and C. Torras, "A Group Theoretic Approach to the Computation of Symbolic Part Relations," IEEE Journal of Robotics and Automation, Dec., 1988, vol., 4, No. 6.

R. H. Wilson and J. F. Rit, "Maintaining geometric dependencies in an assembly planner," in Proceedings of the IEEE International Conference on Robotics and Automation, 1990, pp. 890–895.

R. L. Hoffman, "Automated Assembly in CSG domain," in 1989 IEEE International Conference on Robotics and Automation, (Scottsdale, Ariz.), 1989, pp. 210–215.

J. D. Wolter, "On the Automatic Generation of Assembly Plans," in Proceedings of IEEE Conference on Robotics and Automation, 1989, pp. 62–68.

S. Lee and Y. G. Shin, "Assembly Planning based on Subassembly Extraction," in Proceedings of the 1990 IEEE Conference on Robotics and Automation, (Cincinnati, Ohio), May, 1990, pp. 1606–1611.

S. Lee and Y.G. Shin, "A Cooperative Planning System for Flexible Assembly," in Proceedings of the 2nd International Conference on Computer Integrated Manufacturing, (Troy, N.Y.), May, 1990.

L. S. Homem de Mello and A. C. Sanderson, "Evaluation and Selection of Assembly Plans," in Proceedings of the 1990 IEEE Conference on Robotics and Automation, (Cincinnati, Ohio), May 1990.

G. Boothroyd and P. Dewhurt, Design for Assembly. Pendon/IPC, Inc., 1984.

R. L. Hoekstra, "Design for Automated Assembly: An Axiomatic and Analytical Method," SME Technical Paper, Detroit, Michigan, May, 1989.

Y. F. Huang and C. S. G. Lee, "Precedence Knowledge in Feature Mating Operation Assembly Planning," Proceeding of the 1989 IEEE Conference on Robotics and Automation.

J. M. Henrioud, F. Bonneville and A. Bourjault, "Evaluation and Selection of Assembly Plans," in APMS '90, (Espoo, Finland), Aug., 1990, pp. 212–219.

N. J. Nilsson, Problem-Solving Methods in Artifical Intelligence. McGraw-Hill Inc., 1971.

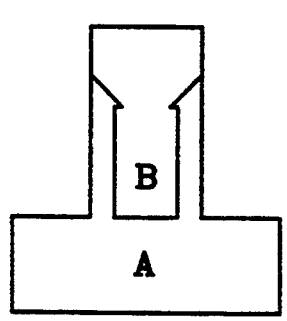
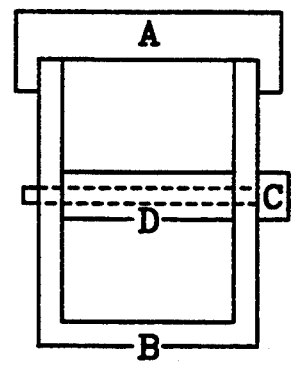
FIG. 4a       FIG. 4b
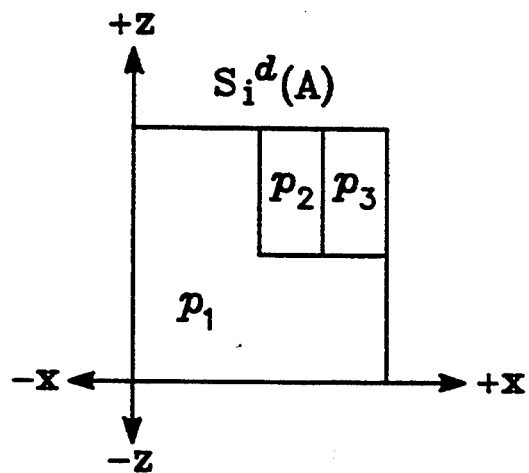
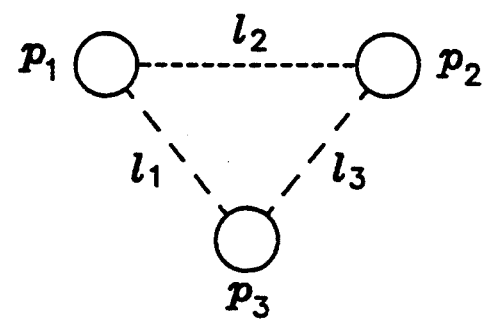
FIG. 7a       FIG. 7b
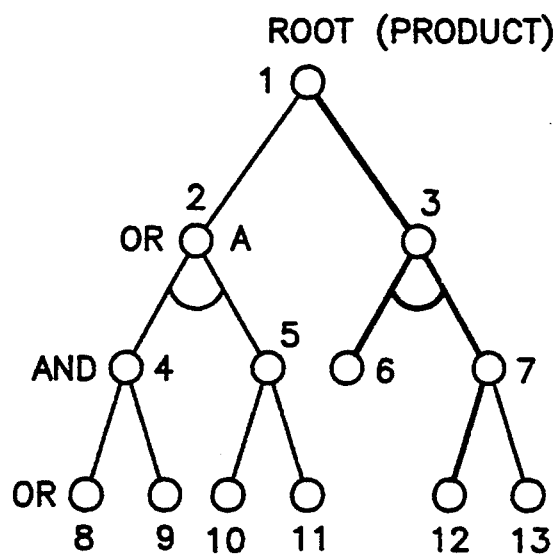
FIG. 8

//=# BACKWARD ASSEMBLY PLANNING WITH DFA ANALYSIS

ORIGIN OF THE INVENTION

The invention described herein was made in the performance of work under a NASA contract, and is subject to the provisions of Public Law 96-517 (35 USC 202) in which the contractor has elected not to retain title.

This application is a continuation of application Ser. No. 07/942,499, filed Aug. 28, 1992 now abandoned.

BACKGROUND OF THE INVENTION

1. Technical Field

The invention relates to a method and apparatus for performing backward assembly planning and operation using backward search of assembly sequences.

2. Background Art

Assembly planning can be based either on the forward search of assembly sequences or on the backward search of assembly sequences, given geometric and topological information on the product to be assembled. The backward search of assembly sequences is often implemented in the form of disassembly planning, assuming that an assembly sequence can be obtained by reversing the order of the corresponding disassembly sequence. Although there are cases where assembly sequences may not be the reverse of the corresponding disassembly sequences, disassembly planning is widely used in the research community due to its advantage in planning efficiency: The disassemblability of a part or a subassembly directly implies the satisfaction of precedence relationship, whereas, in the forward search, the satisfaction of precedence relationship between a pair of mating parts may not be known immediately until an exhaustive search is completed.

Much effort has been expended to make assembly planning or disassembly planning more autonomous, more efficient, and closer to reality. Early work on interactive assembly planning was concerned about formulating a necessary and sufficient set of questions to be answered by the human designer that; leads to the complete specification of precedence relationships with the minimum number of question-and-answering operations. Subsequently, the emphasis has been moved to automatic reasoning of geometric interference or path planning as a means of identifying precedence relationships in assembly. The feasibility of automating geometric reasoning in assembly planning is fueled by the development of powerful computer-based geometric modeling and reasoning tools. The automatic test for the existence of a mating path in disassembly or assembly is still computationally very expensive; and this significantly limits the number of parts that can be handled by an automatic assembly planner, since the number of feasible assembly sequences may grow exponentially, so does the number of required tests for path existence. One of the current research goals is thus to achieve planning efficiency by avoiding unnecessary tests for path existence, as proposed by such methods as the logical inference of path existence based on the previous results on path planning, the test of necessary conditions for successful mating, which are simple to implement, prior to the application of path planing, the use of path finding heuristics.

It becomes clear that, to bring assembly planning closer to reality, we need to consider not only identifying the geometric interference in part mating, but also many other factors which affect assembly planning in a real factory environment: special processes such as testing, labeling, painting, grinding, etc. to be performed during assembly; physical constraints due to magnetic and electrostatic interference; stability of parts and subassemblies which directly affect assembly cost due to required fixtures; part and subassembly manipulability; the required number of reorientations during assembly; tolerance propagation; as well as the physical constraints imposed by assembly layouts. The above factors should eventually be incorporated into the process of identifying precedence relationships as well as selecting preferred assembly sequences. For instance, the required special processes, the physical interference, and the stability requirement can be used in precedence indentification together with the geometric interference condition. While, the stability, the manipulability, the assembly direction and reorientation, and the tolerance associated with parts, subassemblies, and their matings can be used in selecting prefered assembly sequences. However, the selection of a cost-effective assembly sequence is not simple and remains as one of major research issues in assembly planning. This is not only due to the fact that evaluating the above mentioned conditions is difficult and computationally expensive but also the optimality in assembly planning may not be achievable through the local optimization of the above conditions but requires the consideration of global effect.

The present invention includes a process for backward assembly planning and performance which takes the above issues into consideration.

SUMMARY OF THE INVENTION

A method of selecting and performing a sequence of sub-assembly operations to construct an assembly begins by identifying all direct subassemblies of the assembly by identifying potential subassemblies of the assembly, and, for each potential subassembly, determining whether the potential subassembly is a direct subassembly of the assembly by: (1) determining whether there is a common axis of separation between the potential subassembly and the remainder of the assembly, (2) determining whether the potential subassembly is stable, and (3) determining whether there is a direct unobstructed path between the potential subassembly and the remainder of the assembly. The identifying potential subassemblies is performed by identifying all liaisons connecting pairs of nodes of each potential subassembly of the assembly, and, for each of the liaisons, merging liaisons for which there is no accessibility for interconnection between the subassembly and the assembly and merging liaisons which have no force-deliverable paths to the assembly. It is further performed by identifying special processes of the assembly of the type comprising testing and cleaning which require certain nodes of the assembly to be processed together during a special process. The identifying potential subassemblies further consists of grouping together nodes of the assembly which must be processed together during special processes of the type comprising cleaning and testing of subassemblies, whereby to prevent identification of potential subassemblies comprising corresponding nodes of the grouping. The overall process further consists of identifying precedent constraints corresponding to required sequences of assembly of parts of the assembly, and the identifying potential subassemblies further consists of grouping together nodes of the assembly which must be assembled in a hierarchical sequence corresponding to the precedent constraints, whereby to prevent identification of potential subassemblies comprising corresponding nodes of the hierarchical sequence. The determining whether potential subassembly is stable consists of determining that one of (a) the potential subassembly has more only one translational degree of freedom and only one rotational degree of freedom, the one rotational degree of freedom being about the translational axis only, or (b) any floating of disconnected liaison of the potential subassembly includes a node of the remainder of the assembly. The determining whether the potential subassembly is stable consists of determining that the potential subassembly is unstable if either the potential subassembly is unstable or the remainder of the assembly is unstable. The process further consists of computing a cost of mating and assemblying each direct subassembly, by determining the number of part reorientations required to construct the subassembly and determining the number of mating operations required to construct the subassembly. The process further consists of representing the assembly as a tree of AND and OR nodes beginning with all direct subassemblies as bottom nodes of the tree and concluding with the assembly as the top node of the tree, the tree comprising branches connecting adjacent ones of the nodes, the branches corresponding to alternative decompositions of the assembly and computing a local cost of each OR node of the tree and eliminating branches corresponding to OR nodes of higher costs, and performing an assembly operation of subassemblies corresponding to the tree after the eliminating. The local cost computation consists of determining the relative cost due to the stabilization of the direct subassembly and the remainder of the assembly by using holding devices, and determining the relative cost due to reorientation operations.

BRIEF DESCRIPTION OF THE DRAWINGS

FIGS. 4a and 4b illustrate two assemblies in which an assembly sequence is not the reverse of a disassembly sequence.

FIGS. 7a and 7b illustrate how the internal freedom of motion of a subassembly is determined.

FIG. 8 illustrates an AND-OR tree employed in the invention as the search space for the AO* algorithm.

DETAILED DESCRIPTION OF THE INVENTION

1 Assembly Representation

Figure 1:
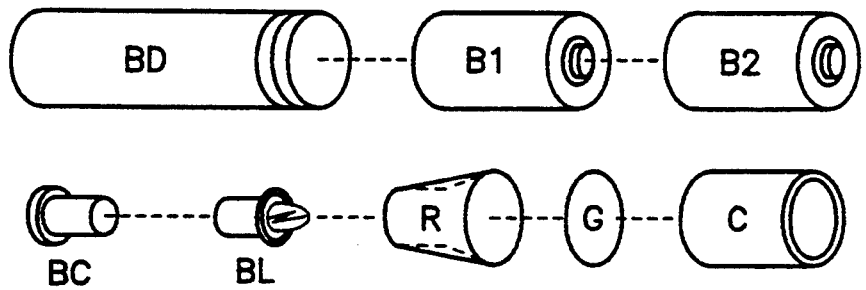
FIG. 1 is an exploded view of a flashlight assembly employed as a tutorial example of an application of the present invention.

An assembly A is a cluster of parts assembled together by a certain assembly sequence, which maintains a particular geometric relationship among parts. More specifically, a cluster of parts, P, is considered as an assembly, iff 1) Every part in P has at least one geometric constraint in relation with other parts in P.
2) There exists at least one assembly sequence which can put all the parts of P together to satisfy the geometric constraints imposed on themselves.
3) P is stable in a sense that it can maintain its geometric constraints either by itself or through the aid of holding devices.

The above definition extends the notion of conventional assembly to include a disconnected and non-self-stable assembly that may be generated during the assembly of the product.

Formally, an assembly A is represented by 4-tuples:

$$A = \{P(A), G_L(A), G_P(A), (A)\},$$

where P(A) represents the set of parts constituting A, $G_L(A)$ the attributed liaison graph representation of A, $G_P(A)$ the special process and constraint forest associated with A, and (A) the set of all the feasible assembly sequences for A.

1.1 Attributed Liaison Graph

A liaison is said to exist between a pair of parts if one part constrains the freedom of motion of the other by a direct contact. A liaison graph is a graph, G, G=(N, E), with N representing a set of nodes, and E representing a set of edges. A node n, n N, is assigned to each part of an assembly, and an edge e, e E, is assigned to a liaison between a pair of parts. An attributed liaison graph is a liaison graph with frames attached to individual nodes and edges of the liaison graph to describe the attribute associated with a node or an edge. A part frame attached to each node describes the attributes associated with a part, including 1) the part geometry and coordinate, 2) the mating volumes and the contact surfaces as part features, and 3) the physical properties of a part such as weight. An edge frame attached to each liaison describes attributes associated with the liaison. The attributes of a liaison consist of 1) the parts in associated with the liaison, 2) the mating features and mating directions, 3) the mating type such as insertion and place-on, and 4) the interconnection type such as Attachment, Force-fit, Connectors/Retainers, Push-and-Twist, Screw, Glue, or Welding. Thus, $G_L(A)$ contains information on the topology of part configurations, the geometry and relative pose of parts in A, the interconnection mechanisms of part connections, and the local freedom of motion in part mating.

1.2 Special Process and Constraint Forest

The assembly of a product involves not only the interconnection of parts to form required liaisons but also the execution of special processes such as testing, cleaning, surface treatment, painting and packaging during assembly. In addition, there may exist assembly constraints that should be satisfied in order to prevent electrostatic, electromagnetic, and thermal interference, as well as mechanical vibrations and chemical pollutions, during assembly. The accomplishment of special processes and the satisfaction of assembly constraints impose precedence relationships in assembly. Especially, assembly precedence relationships should be generated in such a way as to guarantee the execution of multiple special processes in a certain precedence order.

Special processes and assembly constraints associated with A are represented by the special process and constraint forest, $G_p(A)$, consisting of the special process forest, $G_s(A)$, and the assembly constraint forest, $G_c(A)$.

The special process forest, $G_s(A)$, consists of a set of trees having the following properties:
1) A node $n_i^s$ of $G_s(A)$ represents a special process, $S_i$. $n_i^s$ is associated with a tuple $(P_i^s, \Sigma_i^s)$ where $P_i^s$ represents a set of parts involved in $S_i$, and $\Sigma_i^s$ represents the union of the parts involved in $S_i$ and all the special processes that should precede $S_i$: $\Sigma_i^s = P_i^s \cup \{\cup_j \Sigma_j^s\}$, $\forall n_j^s$: $n_j^s$ is a child of $n_i^s$ (a recursive definition).
2) A branch $b_i^s$ connecting the two nodes, $n_i^s$ and $n_j^s$, represents the precedence relationship between $S_i$ and $S_j$: $S_j < S_i$ if $n_j^s$ is a child of $n_i^s$. Special processes corresponding to the sibling nodes of a tree or to the nodes of different trees have no precedence relationship.

The assembly constraint forest, $G_c(A)$, consists of a set of trees having the following properties:
1) A node $n_i^c$ of $G_c(A)$ represents a liaison $l_i$ of $G_L(A)$. $n_i^c$ is associated with a tuple $(P_i^c, \Sigma_i^c)$, where $P_i^c$ represents a pair of parts involved in $l_i$, $\Sigma_i^c$ represents the union of the parts involved in $l_i$ and all the liaisons that should precede $l_i$: $\Sigma_i^c = P_i^c \cup \{\cup_j \Sigma_j^c\}$, $\forall n_j^c$, $n_j^c$ is a child of $n_i^c$.
2) A branch $b_i^c$ connecting $n_i^c$ and $n_j^c$ represents a precedence relationship between $l_i$ and $l_j$: $l_j < l_i$ if $n_j^c$ is a child of $n_i^c$. Liaisons corresponding to the sibling nodes of a tree or to the nodes of different trees have no precedence relationship.

Example: Flashlight Assembly

Figure 3:
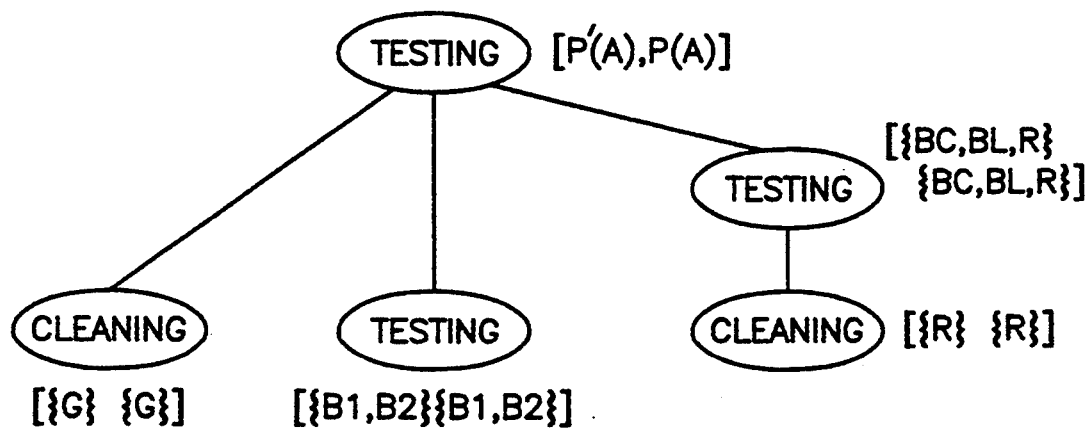
FIG. 3 illustrates the special process forest of the flashlight assembly of FIG. 1.
Figure 2:
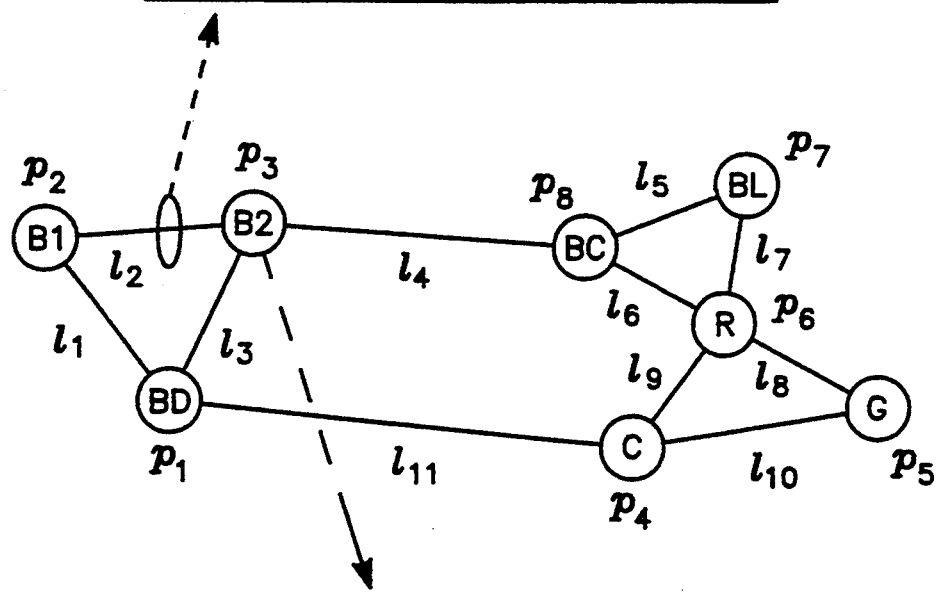
FIG. 2 is a liaison graph of the flashlight assembly of FIG. 1.

The flashlight assembly shown in FIG. 1 consists of a body(BD), two dry cells(B1,B2), a bulb carrier(BC), a bulb(BL), a receptacle(R), lens(G), and a cover(C). FIG. 2 shows the attributed liaison graph representation of the flashlight assembly. FIG. 3 illustrates the special process forest associated with the flashlight assembly. It shows that the cleaning of the receptacle(R) should precede the testing of the bulb unit(BC,BL), such that BC, BL, and R should be clustered in a subassembly during backward assembly planning.

2 Backward Assembly Planning

2.1 Definition

A subassembly of an assembly A, $S_i|A$, is an assembly that can be generated in one of the feasible assembly sequences for A. A direct subassembly of A, $S_i^d|A$, is defined as a subassembly of A, which can be directly assembled with $A - S_i^d|A$ at the last step of one of the feasible assembly sequences for A. The assembly planning of an assembly A, $A = \{P(A), G_L(A), G_P(A), \Pi(A)\}$, is the process of generating a set of assembly sequences $\Pi_a(A) \subseteq \Pi(A)$ based on the given $P(A)$, $G_L(A)$ and $G_P(A)$, and the criteria for selecting preferred assembly sequences. The backward assembly planning of A, BAP(A), represents a particular method for achieving the assembly planning of A, based on the recursive identification and selection of preferred direct subassemblies. BAP(A) first identifies and selects a direct subassembly of A, $S_i^d|A$ (or a set of direct subassemblies of A, $\{S_i^d|A, i=1, \ldots, m\}$) and decomposes A into $S_i^d|A$ and $A - S_i^d|A$ (or $\{S_i^d|A$ and $A - S_i^d|A$, $i=1, \ldots, m\}$). Then, it recursively applies the process of decomposition to the subassemblies generated by the previous decomposition until no further decomposition can be applied.

2.2 Backward Assembly Planning vs. Disassembly Planning

BAP(A) differs from disassembly planning in that BAP(A) can handle the case where an assembly sequence can not be obtained from the reverse of a disassembly-sequence. For instance, a sequence of operations to disconnect a liaison of force-fit interconnection type is often quite different from the reverse of a sequence of operations to interconnect the liaison. As shown in FIG. 4a, the snaps of part A should be widened in order to disassemble part B from part A, which may require a new tool. A more interesting example is given in FIG. 4b, where we can have the following disassembly sequence: C-A-D-B, since Screw C can be disassembled before Cover A is removed. However, the reverse of the above disassembly sequence, B-D-A-C, can not be an assembly sequence, since the inability of holding part D during assembly of screw C prohibits such an assembly sequence. BAP(A) is able to identify that the direct subassembly of (A,B,C,D) is A but not C, and generate a feasible backward assembly sequence, A-C-D-B.

2.3 Identification of $S_i^d|A$

The core of BAP(A) is the identification of $S_i^d|A$. For the identification of $S_i^d|A$, we introduce the following conditions that a cluster of parts $P|A$, $P|A \subset A$, can be a direct subassembly of A:
1) Accessibility Condition: $P|A$ is accessible by a gripper or a tool.
2) Stability Condition: $P|A$ and $A - P|A$ are stable, i.e., they either are self-stable or can be stabilized by external devices.
3) Local Mating Motion Condition: All liaisons between $P|A$ and $A - P|A$ have at least one common axis of separation.
4) Path Existence Condition: $P|A$ can be brought to $A - P|A$ from the free space for melting.
5) Interconnection Feasibility Condition: $P|A$ can be interconnected to $A - P|A$ by applying the interconnection operations defined for the liaisons between $P|A$ and $A - P|A$.
6) Process Constraint Condition: $P|A$ meets the constraints defined by the special process and constraint forest of A, $G_P(A)$.

To avoid the unnecessary evaluation of computationally expensive conditions, such as the path existence condition, we hierarchically evaluate the above conditions. The following sections describe the details of the method for testing the above conditions.

3 Part Clustering

The identification of $S_i^d|A$ can be accomplished by checking the above conditions for individual $P|A$'s defined by the cut-sets of $G_L(A)$. Since the number of cut-sets of $G_L(A)$ is often large and grows exponentially with respect to the number of nodes in $G_L(A)$, testing all the cut-sets of $G_L(A)$ results in inefficiency in assembly planning (especially due to the high cost of testing the path existence condition).

The number of the cut-sets that require the test of path existence condition may be reduced considerably if we first select those cut-sets that satisfy the interconnection feasibility condition, the process constraint condition, and the stability condition, prior to the evaluation of the path existence condition. For the selection of those cut-sets satisfy the interconnection feasibility and process constraint conditions, we first construct an abstract liaison graph, $\hat{G}_L(A)$, from $G_L(A)$, as follows:

1) Merging those parts of A that cannot be interconnected, although it is assumed that those parts are already brought into their mating position. This process identifies the liaisons of G L(A) that violate the interconnection feasibility condition, by reasoning whether the preconditions for a particular interconnection mechanism associated with a liaison can be satisfied.
2) Grouping those parts that should belong to the same subassembly to meet the requirement of special processes.

The parts merged together become a supernode, whereas the parts grouped together become a group node in $\hat{G}_L(A)$. Then, the cut-sets of $\hat{G}_L(A)$, where a super node and a group node are considered as a single node, satisfy the interconnection feasibility and process constraint conditions.

3.1 Interconnection Feasibility and Part Merging

A liaison $l_i$ between $P|A$ and $A-P|A$ cannot be completed, even if $P|A$ can be brought into its mating position, if the following conditions are not satisfied:

1) The feasibility of applying tools and installing connectors required for the interconnection of $l_i$.
2) The feasibility of applying a force, while maintaining stability, required for the interconnection of $l_i$.

The test of the first condition can be done by checking the existence of an open channel to the designated part locations, through which tools and connectors can be operated without geometric interference.

The test of the second condition requires reasoning on the force delivery to a liaison $l_i$ through intermediate liaisons. To be more specific, let us first categorize a liaison into one of the following three classes:

1) A liaison is said to be floating if there exists no physical force holding the parts (associated with the liaison) together. For instance, a liaison with the interconnection type of "attachment" is a floating liaison. A floating liaison may or may not be stable, depending on the geometric constraints imposed on the parts associated with the liaison.
2) A liaison is said to be rigid, if there exists physical force holding the associated parts together, by which the liaison becomes self-stable even under the presence of external force. For instance, a liaison with the interconnection type of "force-fit", "welding", or "connectors" may be classified as a rigid liaison.
3) A liaison is said to be firm if there exists a physical force holding the associated parts together, by which the liaison becomes self-stable, although it may exhibit a deformation or a freedom of motion under the presence of external force.

A liaison is associated with its local freedom of motion:

The local freedom of motion of a liaison $l_i$, $LFM(l_i)$, connecting the two parts, $P_1$ and $P_2$, is represented by the freedom of motion of $P_1$ against $P_2$, $LFM(l_i; P_1|P_2)$ or the freedom of motion of $P_2$ against $P_1$, $LFM(l_i; P_2|P_1)$, where $LFM(l_i; P_1|P_2)$ or $LFM(l_i; P_2|P_1)$ is represented in terms of the coordinates of the assembly to which $P_1$ and $P_2$ belong.

A local freedom of motion of a liaison may be changed after the interconnection is completed: A rigid liaison completely loses its local freedom of motion after the interconnection is completed. A firm liaison may show a local freedom of motion, when the force applied to the liaison is more than a certain threshold. To distinguish the local freedom of motion of $l_i$ after the interconnection from that before the interconnection, $LFM_+(l_i)$ is used to represent $LFM(l_i)$ after the interconnection. Note that, due to the orthogonality between motion space and force space, a liaison connot deliver force to the direction where a local freedom of motion exists.

To test the feasibility of applying force required for the interconnection of $l_i$, let us define the following:

Definition: An Accessible Node, A-node

A part is accessible by a tool if it is reachable and graspable by a tool for an assembly operation. A node is accessible if any of the parts forming the node is accessible.

Definition: An Access Path to a node n, A-path

An access path to a node n, A-path, is a path starting from an A-node and ending with the node n without having any other A-node in the middle of the path. By definition, an A-node has an A-path to itself. An access path is represented by an ordered set of liaisons or parts on the patch. A node may have one or more A-paths. A pair of A-paths, A-path($n_a$) and A-path($n_2$), $n_1 \neq n_2$, are said to be independent each other, if they share no common part.

Definition: The Internal Motion Space, $\mathcal{M}[A\text{-path}(n)]$, and the Static Force Space, $\mathcal{F}[A\text{-path}(n)]$, associated with A-path(n)

The internal motion space, $\mathcal{M}[A\text{-path}(n)]$, of A-path(n) is defined by the union of the local freedom of motion of individual liaisons in A-path(n), and represents the flexibility that the configuration of parts along A-path(n) can be deformed by an external force, with the first part (corresponding to A-node) and the last part (corresponding to the node n) fixed in space. Note that $\mathcal{M}[A\text{-path}(n)]$ is a function of the external force applied to A-path(n) when A-path(n) includes firm liaisons, since the external force determines which firm liaisons can be broken. As will be explained shortly, the external force to be applied to A-path(n) is given as the force required for the interconnection of the liaison which n is associated with, and is subject to the evaluation of force-deliverability.

Assume that A-path(n) is represented by an ordered set of liaisons, $\{l_1, l_2, \ldots, l_r\}$, with $l_i$ formed by a pair of nodes, $(n_{i1}, n_{i2})$, and that $(n_{i1}, n_{i2})$ is ordered along A-path(n) in the direction toward n. Then, $\mathcal{M}[A\text{-path}(n)] = \cup_{i=1}^{r} LFM(l_i; n_{i1}|n_{i2})$. The static force space, $\mathcal{F}[A\text{-path}(n)]$, of A-path(n) defines the static force that can be delivered to the node n through A-path(n). $\mathcal{F}[A\text{-path}(n)]$ is represented by the orthogonal complement of $\mathcal{M}[A\text{-path}(n)]$, i.e., $\mathcal{F}[A\text{-path}(n)] = \{\pm x, \pm y, \pm z, \pm \psi, \pm \theta, \pm \phi\} - \cup_{i=1}^{r} LFM(l_i; n_{i1}|n_{i2})$.

Definition: A Force-Deliverable A-path

A-path($n_{i1}$) is said to be force-deliverable to $n_{i1}$ for the liaison $l_i$ of $(n_{i1}, n_{i2})$ if $\mathcal{F}[A\text{-path}(n_{i1})]$ includes the force required for the interconnection of $n_{i1}$ to $n_{i2}$.

The interconnection feasibility condition of a liaison of $(n_{i1}, n_{i2})$ is now transformed to the verification of the existence of an independent force-deliverable A-path for $n_{i1}$ and $n_{i2}$. The force-deliverability of an A-path to $n_{i1}$ or $n_{i2}$ depends on the force required for the interconnection of $l_i$. That is, $\mathcal{M}[A\text{-path}(n_{i1})]$ or $\mathcal{M}[A\text{-path}(n_{i2})]$ is determined by the freedom of motion of individual liaisons along the A-path under the presence of an external force equivalent to the force required for the interconnection of $l_i$. For instance, in case $l_i$ is floating, the amount of force required by $l_i$ is negligible, and the decision of the internal motion space of the A-path is based solely on the floating liaisons along the path. Note that, in this case, the force-deliverability of $l_i$ becomes equivalent to the feasibility of maintaining stability during interconnection.

As a summary, we present the following merging principle:

Merging Principle:

The liaison $l_i$ of $(n_{i1}, n_{i2})$ can not be listed as a cut-set, and consequently $n_{i1}$ and $n_{i2}$ should be merged together, if one of the following conditions is true:

1) It is not feasible for the tools and connectors (required for the interconnection of $l_i$) to access the designated locations.
2) Either $n_{i1}$ or $n_{i2}$ has no independent force-deliverable A-path, including the case where either $n_{i1}$ or $n_{i2}$ has no A-path at all.

The following algorithm summarizes the process for part merging:

Algorithm: Part Merging
  Input: $G_L(A)$.
  Output: $\hat{G}_L(A)$ with super nodes.
Method:
  Step 1. Put all the liaisons of $G_L(A)$ in Open set. Identify A-nodes of $G_L(A)$.
  Step 2. If Open set is empty, then stop.
  Step 3. Select a liaison $l_i$ from Open set in an order starting from an A-node, and remove $L_i$ from Open set.
  Step 4. Check whether $l_i$ requires tools or connectors to complete the interconnection. If not, go to Step 6.
  Step 5. Check the accessibility of tools or connectors to the designated locations. If not, merge $n_{i1}$ and $n_{i2}$ associated with $l_i$ and go to Step 2.
  Step 6. Check whether $n_{i1}$ and $n_{i2}$ have independent, force-deliverab A-paths. If not, merge $n_{i1}$ and $n_{i2}$ and go to Step 2.
  Example: Part Merging of the Flashlight Assembly The A-nodes of the flashlight assembly are identified as BD and C (refer to FIG. 2). To show how each liaison in FIG. 2 can be tested for the merging, let us consider $l_9$ as an example:

For $l_9$ of (C,R), A-path for C is {C}, whereas A-paths for R are {C,R}, {C,G,R}, {BD,B2,BC,R}, {BD,B1,B2,BC,R} and {BD,B1,B2,BC,BL,R}. $l_9$ does not require a tool or a connector to complete the interconnection. The part, C, has a force-deliverable A-path, {C}; however the part, R, does not have a force-deliverable A-path independent of {C}. This is because all A-paths for R from BD can not deliver force to R due to the floating liaisons $l_1$, $l_2$, $l_4$, $l_5$, and $l_7$. Therefore, $l_9$ is merged.

Figure 5:
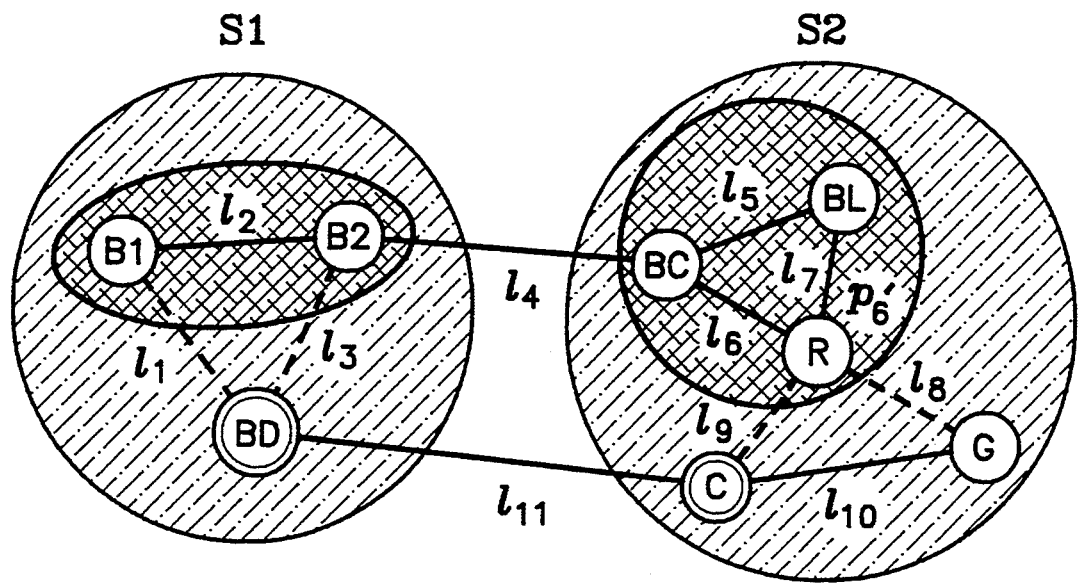
FIG. 5 illustrates the clustering process of the flashlight assembly of FIG. 1.

FIG. 5 shows the result of the merging process. In the drawing, a circle represents a node; a dash line represents a floating liaison; a thin solid line represents a firm liaison; a heavy solid line represents a rigid liaison; single hatching represents merging; and cross-hatching represents grouping.

3.2 Special Process Constraints and Part Grouping

The recursive determination of $S_i^d | A$ in backward assembly planning should support the execution of special processes in an order specified by $G_s(A)$ and satisfy the assembly constraints specified by $G_c(A)$. This requires the identification of those parts of A that should be grouped together, or should not be divided into $S_i^d|A$ and $A-S_i^d|A$, in order to implement the special process forest $G_s(A)$ and the assembly constraint forest $G_c(A)$ as follows:

1) Given $G_s(A)$, we first determine which special processes should be executed with A, i.e., the selection of one or more special processes executable with A from $G_s(A)$ in a top-down order from the root nodes (note that there can be multiple trees in $G_s(A)$ ). We then remove out those nodes corresponding to the selected special processes from $G_s(A)$, resulting in $G'_s(A)$. Since the special processes remaining in $G'_s(A)$ need to be accomplished in the later stage of backward assembly planning, we should group those parts in the accumulated part list of each of the root nodes of $G'_s(A)$.

2) In order to preserve the precedence relationship defined by $G_c(A)$, we should group those parts in the accumulated part list of each child of individual root nodes of $G_c(A)$. Note that a liaison represented by a root node of $G_c(A)$ is eligible for decomposition at the current stage of backward assembly planning, and is exempt fibre grouping.

Grouping Principle:

For a given A, $G_L(A)$, $G_s(A)$ and $G_c(A)$, we group those nodes of $G_L(A)$ that belong to either of the following lists:

1) $\Sigma_0{}_i{}^s$ associated with each root node $n_{0i}{}^s$, of $G'_s(A)$ where $G'_s(A)$ is obtained by removing out from $G_s(A)$ those nodes that are selected for processing with A.
2) $\Sigma_{1i}{}^c$ associated with each child, $n_{1i}{}^c$, of individual root nodes of $G_c(A)$.

Example: Part Grouping of the Flashlight Assembly

Figure 6:
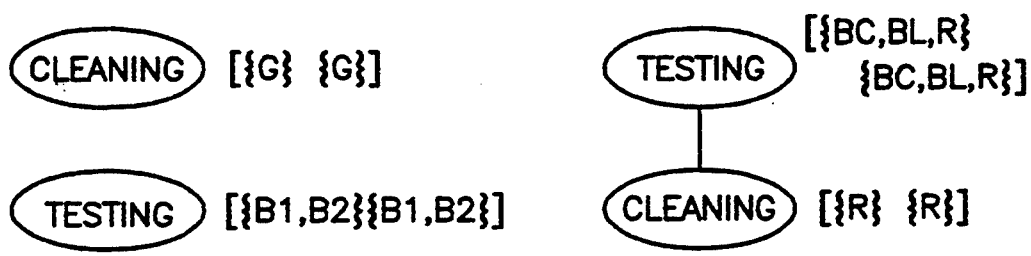
FIG. 6 illustrates the special process forest of FIG. 3 after removing the root node.

First, $G'_s(A)$ is obtained in FIG. 6, since the testing of the whole assembly should be done with A.

Then, {B1,B2} and {BC,BL,R}, the accumulated part lists of individual root nodes of $G'_s(A)$, become groups and {BC,BL,R} becomes another group, as shown in FIG. 5. {G} is a single part and is not indeed in the group list.

4 Identification of Direct Subassemblies

The problem of finding direct subassemblies is now transformed into the problem of finding valid cut-sets of the abstract liaison graph. $\hat{G}_L(A)$. A cut-set,$\gamma_i$, decomposes $\hat{G}_L(A)$ into disjoint subgraph, $\hat{G}_L{}^{S1}(A, \gamma_i)$ and $\hat{G}_L{}^{S2}(A, \gamma_i)$ where $\hat{G}_L{}^{S1}(A, \gamma_i)$ or $\hat{G}_L{}^{S2}(A, \gamma_i)$ may not be a connected graph, but may be a collection of multiple connected subgraphs, $\hat{G}_L{}^{S1}(A, \gamma_i)=\{\hat{G}_L{}^{S1j}(A, \gamma_i), j=1, 2, \ldots, l_1)\}$ or $\hat{G}_L{}^{S2}(A, \gamma_i)=\{\hat{G}_L{}^{S2j}(A, \gamma_i), j=1, 2, \ldots, l_2\}$. A cut-set, $\gamma_i$, is valid if: 1) Each connected subgraph, $\hat{G}_L{}^{S1j}(A, \gamma_i)$, $j=1, 2, \ldots, l_1$, $\hat{G}_L{}^{S2j}(A, \gamma_i)$, $j=1, 2 \ldots, l_2$, generated by the cut-set,$\gamma_i$ includes at least one A-node. 2) There exists a collision free path between the cluster of parts, P|A corresponding to $\hat{G}_L{}^{S1}(A, \gamma_i)$ and $A-P|A$, corresponding to $\hat{G}_L{}^{S2}(A, \gamma_i)$ for their mating.

The first condition ensures that P|A and $A-P|A$, can be handled by a tool for assembly, whereas the second condition ensures that $S_i^d|A$ can be placed in its mating position. For the test of the second condition, let us define the following:

1) The predicate LM(P|A, $A-P|A$) is true if all the liaisons between P|A and $A-P|A$ has at least one common axis of separation.
2) The predicate PE(P|A, $A-P|A$) is true if there exists a path along which the cluster of parts P|A can be brought to its mating position without colliding with the rest of the assembly.

Since the premise that $LM(P|A, A-P|A)$ is not true is a sufficient condition that $PE(P|A, A-P|A)$ is not true, the test of $LM(P|A, A-P|A)$ preceding the test of $PE(P|A, A-P|A)$ can provide a considerable reduction in the number of the costly $PE(P|A, A-P|A)$ test.

Algorithm: Identification of Direct Subassemblies

Input: $\hat{G}_L(A)$, A-Node Set {all the A-nodes of $\hat{G}_L(A)$}, Tested Cut-set List={∅}, Valid Cut-set List={∅}.

Output: A list of direct subassemblies specified in Valid Cut-set List.

Method:
- Step 1. If A-node Set is empty, stop.
- Step 2. Select an A-node from A-node Set, and remove it from A-node Set.
- Step 3. If there exists a cut-set $\gamma_i$, $\gamma_i \notin$ Tested Cut-set List, such that $\hat{G}_L^{S1}(A, \gamma_i)$ includes the A-node selected in Step 2 and $\hat{G}_L^{S2}(A, \gamma_i)$ includes at least one A-node of $\hat{G}_L(A)$, then continue. Otherwise, go to Step 1.
- Step 4. Put $\gamma_i$ into Tested Cut-set List.
- Step 5. Test $\gamma_i$ for LM. If it is false, go to Step 3.
- Step 6. Test $\gamma_i$ for stability. That is, if one of the subassemblies produced by $\gamma_i$ is unstable or the subassemblies produced by $\gamma_i$ have no common assembly pose among themselves go to Step 3.
- Step 7. Test $\gamma_i$ for PE. If it is true, put $\gamma_i$ in Valid Cut-set List. Otherwise, go to Step 3.

The details of the method for testing the stability of $\gamma_i$ will be presented in the next section.

5 Subassembly Evaluation

The direct subassemblies identified from $\hat{G}_L(A)$ are subject to further evaluation for the selection of preferred direct subassemblies.

The evaluation of a subassembly is based on the following criteria: 1) Stability, 2) Directionality, and 3) Manipulability, which leads to an estimate of assembly cost involved in local assembly through the identification of the required holding devices and reorientations during assembly. Note that the optimal selection of a direct assembly at each stage of backward assembly planning based on local evaluation may not yield a globally optimal plan. As will be shown later, this problem is handled by the AO* algorithm with its cost and heuristic functions defined in terms of the above criteria.

5.1 Stability

The stability of a subassembly can be represented in terms of the internal freedom of motion associated with the subassembly. To present a method formalizing the internal freedom of motion of a subassembly, let us first define the following: A cluster of parts in $S_i^d|A$, $\tilde{P}_k|(S_i^d|A)$, is said to be floating if it is connected to the rest of $S_i^d|A$ only by floating liaisons. $\tilde{P}_k|(S_i^d|A)$ corresponds to a subgraph of $G_L(S_i^d|A)$ that can be separated from $G_L(S_i^d|A)$ by a cut-set consisting only of floating liaisons (denoted here as a floating cut-set). A cluster of parts in $S_i^d|A$, $\dot{P}_k|(S_i^d|A)$, is said to be disconnected, if it has no liaison connected to the rest of $S_i^d|A$. $\dot{P}_k|(S_i^d|A)$ corresponds to a disjoint subgraph in $G_L(S_i^d|A)$. The stability of $S_i^d|A$ can be defined based on a set of floating clusters of parts, $\tilde{P}_k|(S_i^d|A)$, and disconnected clusters of parts, $\dot{P}_k|(S_i^d|A)$, included in $S_i^d|A$. Let us assume that a floating cut-set, $\tilde{r}_k$, of $G_L(S_i^d|A)$ decomposes $S_i^d|A$ into $\tilde{P}_k|(S_i^d|A)$ and $S_i^d|A - \tilde{P}_k|(S_i^d|A)$. The local freedom of motion of $\tilde{r}_k$, $LFM(\tilde{r}_k)$, can be defined as the local freedom of motion of $\tilde{P}_k(S_i^d|A)$ against $S_i^d|A - \tilde{P}_k|(S_i^d|A)$:

$$LFM(\tilde{r}_k) \triangleq LFM(\tilde{P}_k|(S_i^d|A), S_i^d|A - \tilde{P}_k|(S_i^d|A))$$
$$= \cap LFM(l_j, \tilde{P}_k|(S_i^d|A), S_i^d|A - \tilde{P}_k|(S_i^d|A)),$$

for all $l_j$, $l_j \in \tilde{r}_k$.

Note that $\tilde{P}_k|(S_i^d|A)$ should be chosen in such a way that $S_i^d|A - \tilde{P}_k|(S_i^d|A)$ includes one of the A-nodes of the assembly A that will be used for holding $S_i^d|A$ during the mating of $S_i^d|A$ with $A - S_i^d|A$. Now let us define the following:

Definition: Internal Freedom of Motion of $S_i^d|A$

The internal freedom of motion of $S_i^d|A$, IFM$(S_i^d|A)$, is defined as a collection of assembly directions to which $S_i^d|A$ can be broken apart. IFM$(S_i^d|A)$ can be calculated by the following rules:
1) $\not\exists \ \dot{P}_k|(S_i^d|A)$ and $\tilde{P}_k|(S_i^d|A) \Rightarrow IFM(S_i^d|A) = \emptyset$;
2) $\not\exists \ \dot{P}_k|(S_i^d|A)$ but $\exists \ \tilde{P}_k|(S_i^d|A) \Rightarrow IFM(S_i^d|A) = \cup LFM(\tilde{r}_k), \forall \tilde{r}_k$;
3) $\exists \ \dot{P}_k|(S_i^d|A) \Rightarrow IFM(S_i^d|A) = \{\pm x, \pm y, \pm z, \pm \psi, \pm \theta, \pm \phi\}$.

As an example, let us consider a simple 2-D assembly shown in FIGS. 7a and 7b.

Since $l_1$, $l_2$ and $l_3$ are floating liaisons, we have that $\tilde{r}_1 = \{l_1, l_2\}$, $\tilde{r}_2 = \{l_1, l_3\}$, $\tilde{r}_3 = \{l_2, l_3\}$.

Assuming that $S_i^d|A$ is oriented with reference to the assembly pose of A as shown in FIG. 7, and that $P_1$, an A-node of A, is selected for grasping of $S_i^d|A$, we have $$LFM(\tilde{r}_1) = LFM(P_2 \cup P_3, P_1) = \{+x, +z\},$$

$$LFM(\tilde{r}_2) = LFM(P_2, P_1 \cup P_3) = \{+z\},$$

$$LFM(\tilde{r}_3) = LFM(P_3, P_1 \cup P_2) = \{+x, +z\}.$$

Therefore, $$IFM(S_i^d|A) = \{+x, +z\}.$$

Based on the definition of IFM$(S_i^d|A)$, we can establish the stability condition for $S_i^d|A$, as follows:
1) $S_i^d|A$ is said to be self-stable, if IFM$(S_i^d|A)$ is null, or IFM$(S_i^d|A)$ has at most a single translational freedom of motion with a rotational freedom of motion only about the axis of translation (i.e. $\tilde{P}_k|(S_i^d|A)$ and $S_i^d|A - \tilde{P}_k|(S_i^d|A)$ form a single peg-and-hole type mating relationship).
2) $S_i^d|A$ is said to be stable with the assistance of holding devices, if each $\dot{P}_k|(S_i^d|A)$ or $\tilde{P}_k|(S_i^d|A)$ contains an A-node of the assembly A. This implies that the mating operation of $S_i^d|A$ can be stabilized and completed with the assistance of external devices holding and $\dot{P}_k|(S_i^d|A)$ of more than a peg-and-hole type of motion freedom against $S_i^d|A - \tilde{P}_k|(S_i^d|A)$.
3) Otherwise, $S_i^d|A$ is said to be unstable. A stable $S_i^d|A$, whether it requires a holding device or not, has one or more stable assembly poses, where an assembly pose is represented by assembly coordinate aligned with the direction of part stacking against gravity. For instance, $S_i^d|A$ with null IFM$^h$ (denoting IFM after the incorporation of necessary holding devices) can have assembly pose of $\pm x$, $\pm y$ and $\pm z$.

$S_i^d|A$ with IFM$^h$ of $\{+x, \pm \psi\}$ can have an assembly pose of $+x$, requiring a reorientation of $S_i^d|A$ to align $+x$ with the stacking direction (against gravity).

Let us now consider the stability associated with an assembly operation:

Definition: Stable Assembly Operation

The assembly operation between $S_i^d|A$ and $A-S_i^d|A$ is said to be stable, if $S_i^d|A$ and $A-S_i^d|A$ have at least one common stable assembly pose defining a stable assembly direction.

Now, the evaluation of $S_i^d|A$ in terms of stability is based on the stability of $S_i^d|A$ and $A-S_i^d|A$, as well as the stability of the assembly operation between $S_i^d|A$ and $A-S_i^d|A$:

1) If either $S_i^d|A$ is unstable or $A-S_i^d|A$ is unstable, $S_i^d|A$ can not be selected for a direct subassembly of A.

2) When $S_i^d|A$ and $A-S_i^d|A$ have no common stable assembly pose, $S_i^d|A$ can not be selected for a direct subassembly of A.

3) Otherwise we evaluate the assembly cost incurred by the need to stabilize $S_i^d|A$ and $A-S_i^d|A$ as well as the assembly operation between $S_i^d|A$ and $A-S_i^d|A$.

The assembly cost is directly related to the number of holding devices required for stabilizing $S_i^d|A$ and $A-S_i^d|A$, and the necessity of reorienting $S_i^d|A$ and $A-S_i^d|A$ for a stable assembly operation. The latter will be analyzed in more detail in the next section in relation to the directionality in assembly and the determination of best assembly poses.

5.2 Directionality and Assembly Pose

The directionality in assembly is another important factor affecting assembly cost. Locally, a stacking operation is considered more cost-effective than a non-stacking operation. Globally, a single direction of assembly is preferred to multiple directions of assembly. Therefore, the evaluation of directionality in assembly should be based on both the local assemble direction between $S_i^d|A$ and $A-S_i^d|A$, and the uniformity of assembly directions embedded in $S_i^d|A$ and $A-S_i^d|A$.

It should be noted that whether or not the local assembly direction between $S_i^d|A$ and $A-S_i^d|A$ can be a stacking direction depends on the choice of the mating pose (as one of the stable assembly poses common to $S_i^d|A$ and $A-S_i^d|A$). However, the selection of a mating pose between $S_i^d|A$ and $A-S_i^d|A$ based solely on implementing a stacking operation may incur the need to reorient the assembly of $S_i^d|A$ and $A-S_i^d|A$. The assembly pose of $S_i^d|A$ or $A-S_i^d|A$ should be chosen from the set of stable assembly poses of $S_i^d|A$ or $A-S_i^d|A$, which may differ from the selected mating pose between $S_i^d|A$ and $A-S_i^d|A$. This also incurs the need to reorient $S_i^d|A$ or $A-S_i^d|A$, that $S_i^d|A$ or $A-S_i^d|A$ is brought into its pose. This implies that the determination of an assembly pose and an assembly direction should consider the trade-off between maximizing the directionality in assembly and minimizing the reorientation of assembly pose. In principle, it is desirable to avoid a costly reorientation, unless the reorientation is required to allow many local stacking operations in the subsequent backward assembly planning, thus justifying the cost of reorientation.

<Cost involved in the Local Mating Operation between $S_i^d|A$ and $A-S_i^d|A$>

Let us first introduce the following notational conventions:

1) $t_1$, $t_2 \triangleq$ an assembly pose of $S_i^d|A$ and $A-S_i^d|A$ represented with reference to the previously determined assembly pose of A, $t^*$.

2) $\{t_1^s\}$, $\{t_2^s\} \triangleq$ a set of stable assembly poses for $S_i^d|A$ and $A-S_i^d|A$.

3) $\{t_{12}^s\} \triangleq$ a set of stable assembly poses common to $S_i^d|A$ and $A-S_i^d|A$, i.e., $\{t_{12}^s\}=\{t_1^s\}\cap\{t_2^s\}$.

We can associate each pair $(t_1^s, t_2^s)$ where $t_1^s \in \{t_1^s\}$ and $t_2^s \in \{t_2^s\}$, with the relative assembly cost, L, involved in a local mating operation. L can be determined based on the required number of reorientations and the directionality of mating operations (whether it is a stacking operation or a non-stacking operation), as well as the difficulty of handling the related subassemblies.

The reorientation of the assembly poses of $S_i^d|A$ and $A-S_i^d|A$ during assembly becomes necessary due to:

1) The need to transform $t_1^s$ and/or $t_2^s$ into a mating pose, $t_{12}^s$, $t_{12}^s \in \{t_{12}^s\}$, in the case where $t_1^s \neq t_{12}^s$ or $t_2^s \neq t_{12}^s$.

2) The need to transform the selected mating pose, $t_{12}^s$, into the assembly pose of A, $t^*$ in the case where $t_{12}^s \neq t^*$.

Table 1 shows the reorientations required for the mating between $S_i^d|A$ and $(A-S_i^d|A)$ under various conditions on $t_1^s$ and $t_2^s$. The directionality of the mating operation can be tested by transforming the mating directions (between $S_i^d|A$ and $A-S_i^d|A$) in terms of $t^*$ into the mating directions in terms of $t_{12}^s$, where the mating directions in terms of $t^*$ are identified during the verification of the path existence.

The relative assembly cost, L, involved in a local mating operation can now be calculated for individual $(t_1^s, t_2^s)$, by $$L=[\gamma_1 REO(t_1^s)+\gamma_2 REO(t_2^s)+\gamma_3 REO(t_{12}^s)]\alpha_0+\gamma_4\beta_0,$$

TABLE 1

The Reorientations required for the Local Mating Operation between $S_1^d|A$ and $A - S_i^d|A$

| Conditions | | | The Required Reorientations |
|---|---|---|---|
| $t^* \notin \{t_{12}^s\}$ | $t_1^s=t_2^s$ | $t_1^s \in \{t_{12}^s\}$ | $1(t_{12}^s \rightarrow t^*)$ |
| | | $t_1^s \notin \{t_{12}^s\}$ | $3(t_1^s \rightarrow t_{12}^s, t_2^s \rightarrow t_{12}^s, t_{12}^s \rightarrow t^*)$ |
| | $t_1^s \neq t_2^s$ | $t_1^s \in \{t_{12}^s\}$ or $t_2^s \in \{t_{12}^s\}$ | $2(t_1^s \rightarrow t_{12}^s$ or $t_2^s \rightarrow t_{12}^s, t_{12}^s \rightarrow t^*)$ |
| | | $t_1^s \notin \{t_{12}^s\}$ and $t_2^s \notin \{t_{12}^s\}$ | $3(t_1^s \rightarrow t_{12}^s, t_2^s \rightarrow t_{12}^s, t_{12}^s \rightarrow t^*)$ |
| $t^* \in \{t_{12}^s\}$ | $t_1^s=t_2^s$ | $t_1^s=t^*$ | 0 |
| | | $t_1^s \neq t^*, t_1^s \in \{t_{12}^s\}$ | $1(t_{12}^s \rightarrow t^*)$ |
| | | $t_1^s \neq t^*, t_1^s \notin \{t_{12}^s\}$ | $2(t_1^s \rightarrow t^*, t_{12}^s \rightarrow t^*)$ |
| | $t_1^s \neq t_2^s$ | $t_1^s=t^*$ or $t_2^s=t^*$ | $1(t_2^s \rightarrow t^*$ or $t_1^s \rightarrow t^*)$ |
| | | $t_1^s \neq t^*$ and $t_2^s \neq t^*$ | $2(t_1^s \rightarrow t^*, t_2^s \rightarrow t^*)$ | where $REO(t_1^s)$, $REO(t_2^s)$, and $REO(t_{12}^s)$ are binary functions of either 1 (when the reorientation of the corresponding assembly pose is required) or 0; $\alpha_0$ and $\beta_0$, represent respectively the normal relative assembly cost due to a reorientation and a mating motion, $\gamma_1$, $\gamma_2$, $\gamma_3$ and $\gamma_4$ represent the effect of part manipulability on the relative assembly cost (refer to the next section for more detail). The best assembly poses of $S_i^d|A$, $t^*(S_i^d|A)$, and $A-S_i^d|A$, $t^*(A-S_i^d|A)$ can be determined based on achieving the minimum relative assembly cost, L, due to the local mating operation.

<Cost involved in the Assembly of $S_i^d|A$ and $A-S_i^d|A$>

Let us now consider the uniformity of assembly direction embedded in $S_i^d|A$ and $A-S_i^d|A$, as a means of globally estimating the relative assembly cost, R, involved in the assembly of $S_i^d|A$ and $A-S_i^d|A$. Since the exact evaluation of R can only be obtained after a complete assembly plan is formulated, we indirectly estimate R based on the following two major factors contributing to R:

1) The estimated relative assembly costs, $R_o(S_i^d|A)$ and $R_o(A-S_i^d|A)$, due to the number of reorientations involved in the assembly of $S_i^d|A$ and $A-S_i^d|A$.
2) The estimated relative assembly cost, $R_s(S_i^d|A)$ and $R_s(A-S_i^d|A)$, due to the number of stacking and non-stacking operations involved in the assembly of $S_i^d|A$ and $A-S_i^d|A$.

The estimation of $R_o(S_i^d|A)$ is based on the directional uniformity of $S_i^d|A$ under the special consideration of the necessary reorientation(flip-over) of the bases of $S_i^d|A$, as follows:

$S_i^d|A$ is said to have m degrees of directionality in $\xi (\xi=x, y, \text{ or } z)$, denoted as $D_\xi(S_i^d|A)=m$, in the case where there exist m liaisons, $l_i, i=1 \ldots m$, in $G_L(S_i^d|A)$ such that $+\xi$ or $-\xi \in \{LFM(l_i)\}$ for $i=1 \ldots m$. Note that in defining the directionality of $S_i^d|A$, x, y, and z are referenced in terms of the assembly pose of A, and $LFM(l_i)$ can be computed either by $LFM(l_i; P_1, P_2)$ or $LFM(l_i; P_2, P_1)$, since $LFM(l_i; P_1, P_2)=-LFM(l_i; P_2, P_1)$.

$S_i^d|A$ is said to have the directional uniformity of r in $\xi$, denoted $U_\xi(S_i^d|A)=r$, in the case where $D_\xi(S_i^d|A)/\text{Card } \{l_i, l_i \in G_L(S_i^d|A)\}=r$, where $r \leq 1$. $S_i^d|A$ has the maximum directional uniformity in $\xi$, if $S_i^d|A$ has the maximum directionality in $\xi$.

Now, let us select $U_\xi(S_i^d|A)$ from $\{U_\xi(S_i^d|A), \xi=x, y, \text{ or } z\}$ in a decreasing order until the accumulation of the selected $U_\xi(S_i^d|A)$'s becomes greater than or equal to unity. Define $\{\xi^*(S_i^d|A)\}$ as a set containing $\xi$'s which are associated with the selected $U_\xi(S_i^d|A)$ s. Then, $\{\xi^*(S_i^d|A)\}$ represents the minimum number of distinctive assembly directions involved in the assembly of $S_i^d|A$, such that $\text{Card}\{\xi^*(S_i^d|A)\}-1$ provides an estimate of the lower bound of the number of reorientations required for the assembly of $S_i^d|A$. A more accurate estimate of the required number of reorientations can be obtained by identifying the base flip-overs that become necessary when parts are connected to the both side of a base such that $\{LFM(l_i; \text{Part}_1, \text{Base}), \forall \text{Part}_i \text{ linked to base}\}$ includes both $+\xi$ and $-\xi$. To be more specific on this point, let us define the following: A base node, $n_B$, of $S_i^d|A$, $n_B(S_i^d|A)$, is a node of $G_L(S_i^d|A)$ which has the degree far greater than the average degree of a node of $G_L(S_i^d|A)$, i.e., the degree of $n_B(S_i^d|A) \geq k$. Average Degree of $G_L(S_i^d|A)$, where k is a construct such that $k >> 1$. A base node $n_B(S_i^d|A)$ is said to have the directionality, $D_{nB}(S_i^d|A)$ where $D_{nB}(S_i^d|A)$ is the set of independent directions involved in $\{LFM(l_i; P_1, \text{Base}), \forall l_i: l_i \text{ is linked to } n_B\}$, where $D_{nB}(S_i^d|A) \subseteq \{+x, -x, +y, -y, +z, -z\}$. In the case where $D_{nB}(S_i^d|A)$ contains $+\xi$ and $-\xi$ ($\xi=x$, y, or z), it is necessary to flip-over the base to accomodate $+\xi$ and $-\xi$.

Considering the above $R_o(S_i^d|A)$ can be estimated by the following equation:

$$R_o(S_i^d|A) = a_o \left[ \left( \sum_{\xi=x,y,z} a_\xi \cdot b_\xi - 1 \right) + c_\xi \right],$$

where $$a_\xi = \begin{cases} 2, \text{ if } +\xi \text{ and } -\xi \in D_{nB}(S_i^d|A), n_B \in \{n_b\}: \\ \quad \text{A set of base nodes in } G_L(S_i^d|A) \\ 1, \text{ otherwise} \end{cases}$$

$$b_\xi = \begin{cases} 1, \text{ if } \xi \in \{\xi^*(S_i^d|A)\} \\ 0, \text{ otherwise} \end{cases}$$

$$c_\xi = \begin{cases} 1, \text{ if the selected best pose of } S_i^d|A \notin \{\xi^*(S_i^d|A)\} \\ 0, \text{ otherwise.} \end{cases}$$

The estimate of relative assembly cost for $S_i^d|A$, $R(S_i^d|A)$, is the addition of the estimate of the relative assembly cost due to required reorientations, $R_o(S_i^d|A)$, and the estimate of the relative assembly cost due to required part matings, $R_s(S_i^d|A)$:

$$R(S_i^d|A) = R_o(S_i^d|A) + R_s(S_i^d|A).$$

Since the reorientations considered in the above computation of $R_o(S_i^d|A)$ allow part matings to be done by stacking operations, $R_s(S_i^d|A)$ can be estimated simply as $$R_s(S_i^d|A) = \beta_{01} \cdot N,$$

where N represents the number of parts included in $S_i^d|A$.

An alternative way of estimating $R(S_i^d|A)$ is that $R_o(S_i^d|A)$ is estimated based only on the required number of base flip-overs, so as to avoid costly reorientations as much as possible. Instead, the assembly of $S_i^d|A$ allows non-stacking operations the cost of which should be incorporated into $R_s(S_i^d|A)$. The computation of $R_o(S_i^d|A)$ due only to the base flip-overs can be computed simply by applying different $a_\xi$ to the above equation:

$$a_\xi = \begin{cases} 1, \text{ if } +\xi \text{ and } -\xi \in D_{nB}(S_i^d|A), n_B \in \{n_b\}: \\ \quad \text{A set of base nodes in } G_L(S_i^d|A) \\ 1, \text{ otherwise} \end{cases}$$

Whereas, $R_s(S_i^d|A)$ can be computed by $$R_s(S_i^d|A) = N \cdot [\beta_{01} U_{\xi max}(S_i^d|A) + \beta_{02}(1 - U_{\xi max}(S_i^d|A))],$$

where $$U_{\xi max} \triangleq \{U_\xi(S_i^d|A), \xi=x, y \text{ and } z\}.$$

Then, $R(S_i^d|A)$ is chosen as the lower estimate from the two alternatives described above.

Finally, the global estimation of the relative assembly cost, R, due to directionality, can be obtained by $R=R(S_i^d|A)+R(A-S_i^d|A)$.

5.3 Manipulability

A subassembly subject to either a reorientation and/or a translation for mating should be easily manipulable by tools or hands. The term manipulability of $S_i^d|A$ is used to quantify the efficiency in orienting $S_i^d|A$ and in handling of $S_i^d|A$. The manipulability of $S_i^d|A$ is closely linked to the size, shape and weight of $S_i^d|A$. More specifically, the orientation efficiency can be measured based on the symmetry and marked polarity in the geometry and weight of $S_i^d|A$, whereas the handling efficiency can be measured based on the regularity in the size, weight and shape of $S_i^d|A$, and the flexibility and fragility of $S_i^d|A$ which determine the need for special tooling.

The manipulabilities of $S_i^d|A$ and $A-S_i^d|A$ affect the relative assembly cost of the local mating operation between $S_i^d|A$ and $A-S_i^d|A$, since they directly influence the relative assembly cost for the required reorientations as well as the mating motion.

To take this into consideration, in the previous section, the relative assembly cost for a reorientation, $\alpha$, as well as the relative cost for a mating motion, $\beta$ were determined by multiplying the manipulability coefficient, $\gamma$, to their nominal values, $\alpha_0$ and $\beta_0$.

TABLE 2

The Criteria for Measuring Manipulability of a Part or a Subassembly

| | Relative Assembly Cost |
|---|---|
| Orientation Efficiency | |
| Part tangles, nests or shingles | 5 |
| Asymmetric paxt without marked polarities of weight or geometry | 5 |
| Asymmetric part with marked polarities of weight or geometry | 3 |
| Symmetric part | 1 |
| Part delivered to the assembly station with a known orientation | 1 |
| Handling Efficiency | |
| Large off center weight potentially causing loss of orientation | 5 |
| Very large parts | 5 |
| Very small parts | 5 |
| Fragile | 3 |
| Flexible | 3 |
| Irregular shaped part requiring special tooling | 3 |
| Easily handled part with standard (tooling cau handle more than 1 part) | 1 |

The manipulability coefficient of $S_i^d|A$, $\gamma(S_i^d|A)$, can be determined as the ratio between the sum of the score for each criterion of orientation and handling efficiency for $S_i^d|A$ and the sum of the nominal scores for each criterion of orientation and handling efficiency.

6 Selection of Best Subassemblies based on AO* Algorithm

As indicated earlier herein, the selection of $S_i^d|A$ based solely on the relative assembly costs involved in the local mating operation between $S_i^d|A$ and $A-S_i^d|A$ may not produce a globally optimal assembly plan. Therefore, we adopt the AO* algorithm with a properly defined evaluation function to search for a globally optimal or suboptimal plan.

The search space to which the AO* algorithm is applied can be represented by an AND/OR tree.

The decomposition of an assembly A in backward assembly planning implies the expansion of an AND node (representing an assembly A) into its OR children representing the alternative decompositions of A, $\{(S_i^d|A, A-S_i^d|A), i=1, \ldots, l\}$, and its AND grandchildren $\{S_i^d|A$ and $A-S_i^d|A$, for $i=1, \ldots, l\}$ attached to indivisual OR children, as shown in FIG. 8. The AO* algorithm searches for an optimal solution tree by expanding those AND nodes of the current potential solution tree that are open to expansion, and by evaluating the next alternatives based on an evaluation function.

An AND tree is an AND/OR tree every AND node of which has no more than one OR child. A potential solution tree is an AND tree having the minimum value for the evaluation function at the current stage of search, whereas a solution tree is an AND tree with leaves consisting of only single parts.

The Local Cost, $c_l(n_i^o)$, associated with an OR node $n_i^o$, represents the relative assembly cost incurred by the local mating operation between $S_i^d|A$ and $A-S_i^d|A$. $c_l(n_i^o)$ can be computed by the weighted sum of the following three components:

1) The relative assembly cost due to the stabilization of $S_i^d|A$ and $A-S_i^d|A$ by using holding devices and/or reorientations, as described in Table 1.
2) The relative assembly cost due to the reorientations and translations required for mating between $S_i^d|A$ and $A-S_i^d|A$, as described in Table 2 and Table 3. Note that this cost is linked to the directionalities and best assembly poses for $S_i^d|A$ and $A-S_i^d|A$, as well as the manipulabilities of $S_i^d|A$ and $A-S_i^d|A$.
3) The relative cost of the special processes assigned to A, the parent node of $n_i^o$.

The Accumulated Cost, $c_a(T_i^a)$ associated with an AND tree, $T_i^a$, represents the weighted sum of the following two components:

1) The sum of $c_l(n_i^o)$ for all $n_i^o$, $n_i^o$ $T_i^a$.
2) The depth of $T_i^a$ defined by the maximum depth of $n_i^o$ for all $n_i^o$, $n_i^o$ $T_i^a$ where the depth of an OR node is measured in terms of the depth among OR nodes without considering AND nodes.

The Local Heuristic Estimate, $h_e(n_i^o)$, associated with an OR node $n_i^o$, represents an estimate of the optimal relative assembly cost to assemble $S_i^d|A$ and $A-S_i^d|A$, and can be computed by the weighted sum of the following components:

1) The relative assembly cost, R, associated with the directional uniformity of $S_i^d|A$ and $A-S_i^d|A$, as defined in the previous section.
2) The relative assembly cost, S, associated with the internal stability of $S_i^d|A$ and $A-S_i^d|A$:

$$S=\delta[\chi(S_i^d|A)+\chi(A-S_i^d|A)]$$

where $\chi(S_i^d|A)$ and $\chi(A-S_i^d|A)$ represent the internal stability of $S_i^d|A$ and $A-S_i^d|A$, respectively, and are defined by $$\chi(S_i^d|A) = \frac{\text{the number of floating liaisons in } G_L(S_i^d|A)}{\text{the average degree of a node in } G_L(S_i^d|A)}$$

$$\chi(A - S_i^d|A) = \frac{\text{the number of floating liaisons in } G_L(A - S_i^d|A)}{\text{the average degree of a node in } G_L(A - S_i^d|A)}$$

and $\delta$ represents the relative assembly cost due to a holding device.

Then the evaluation function $e_f(T_i^a)$ associated with an AND tree $T_i^a$ simply becomes $$e_f(T_i^a)=c_a(T_i^a)+\eta h_e(T_i^a),$$

where $\eta$ adjusts the contribution of $h_e(T_i^a)$ to $e_f(T_i^a)$ in relation with $c_a(T_i^a)$.

7 Assembly Planning with DFA Analysis

As shown in the previous section, the evaluation of the local cost, $c_l(n_i^o)$, at an OR node, $n_i^o$, is based on the detailed analysis of $c_l(n_i^o)$ in terms of the stability, the directionality, the assembly pose and the manipulability associated with the assembly of the children of $n_i^o$, as well as the cost of special processes assigned to the parent of $n_i^o$.

The result of this analysis at each OR node of the search tree can directly be used for the identification of the assemblability of a product and for the evaluation of DFA criteria, which can be fed back to the designer for proper design evaluation and modification. The assembly planner developed here has both the capability of selecting an optimal assembly partial order as well as the capability of conducting DFA analysis, serving as a powerful tool for automating the DFA evaluation and modification cycle in concurrent engineering. DFA analysis performed during the process of computing the local cost, $c_l(n_i^o)$ associated with an OR node, $n_i^o$, $n_i^o \sim \{S_i^d|A, A-S_i^d|A\}$, is summarized into the DFA analysis table for $n_i^o$, as illustrated in Table 3.

Now, the analysis of DFA for a given product can be accomplished based on the DFA tables associated with all of the OR nodes of the solution tree.

Example: The Flashlight Assembly

Figure 10:
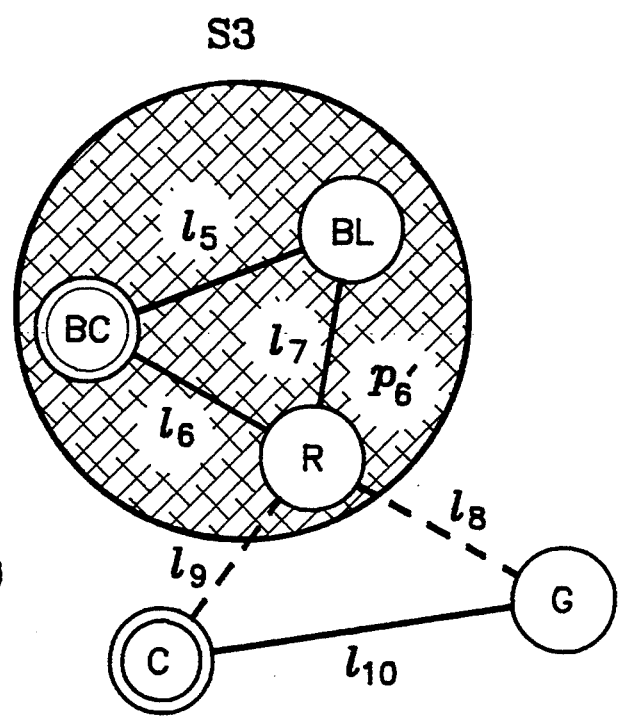
FIG. 10 illustrates the merging and grouping operations corresponding to the liaison graph of FIG. 2.
Figure 9:
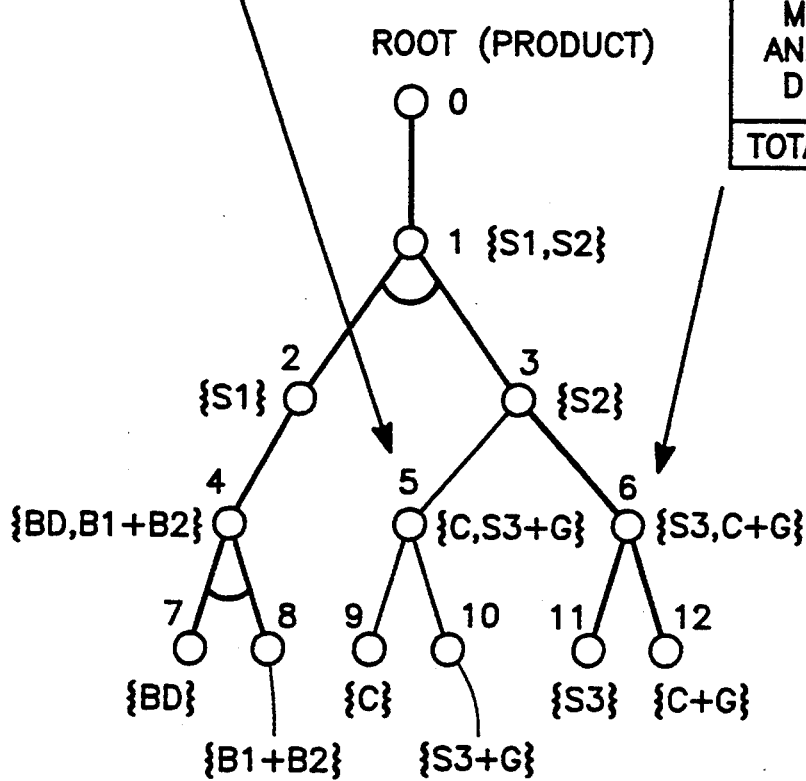
FIG. 9 illustrates the AND-OR tree corresponding to the flashlight assembly of FIG. 1.

The AO* algorithm with the cost and heuristic functions defined in the previous section is applied to the flashlight assembly for finding an optimal solution tree and performing DFA analysis. FIG. 9 illustrates first several nodes of the AND/OR search tree formed by the AO* algorithm, where DFA analysis tables are attached to individual OR nodes. At root node(Node 0), which corresponds to the whole product of flashlight, there is only one direct subassembly(Node 1). S1 or S2 implying that there is only one way to disassemble the product in the first step. Node 1 is expanded to it's AND children, (2,3). Further expansion of Node 2 can be done easily because the grouping of B1 and B2 provides only one alternative in selecting direct subassembly. At Node 3, the abstract liaison graph is shown in FIG. 10. In the drawing, a circle represents a node; a dash line represents a floating liaison; a thin solid line represents a firm liaison; a heavy solid line represents a rigid liaison; single hatching represents merging; and cross-hatching represents grouping. Note that S3 is a group node resulted from the special process forest.

The algorithm to identify direct subassemblies is applied to S2 and the result is shown in Table 4. Therefore, at Node 3, the system identifies two alternative direct subassemblies, C and S3. These two alternatives are represented as the OR

TABLE 3

A DFA Analysis Table for an OR Node, $n_i^o$, $n_i^o \sim \{S_i^d|A, A - S_i^d|A\}$

| DFA Analysis Category | | DFA Criteria Details | |
|---|---|---|---|
| Stability | Total relative cost due to the need to stabilize $S_i^d|A$ and/or $A - S_i^d|A$ | The number of holding devices required for the stabilization of $S_i^d|A$ and/or $A - S_i^d|A$ | The relative cost due to the required holding devices |
| | | The number of reorientations required for the stabilization of $S_i^d|A$ and/or $A - S_i^d|A$ | The relative cost due to the required reorientation |
| Manipulability and Directionality | Total relative cost involved in mating between $S_i^d|A$ and $A - S_i^d|A$ due to manipulability and directionality | The manipulability factors (Refer to Table 2 for more details) | $\gamma(S_i^d|A)$ and $\gamma(A - S_i^d|A)$ |
| | | The best assembly poses for $S_i^d|A$ and/or $A - S_i^d|A$ | |
| | | The number of reorientations required for mating between $S_i^d|A$ and/or $A - S_i^d|A$ | The relative cost due to the required reorientations |
| | | The translational motion during mating between $S_i^d|A$ and/or $A - S_i^d|A$ | The relative cost due to the required translatinal motion for mating |
| Process | Total relative cost for the special processes assigned to A | The list of special processes assigned to A | The relative cost of individual special processes |
| | Total cost at $n_i^o$ | | |

TABLE 4

Valid Cut-Sets or Direct Subassemblies generated from $\tilde{G}_L(A)$ for S2 in the Flashlight Assembly

| Cut-set | P|A | A − P|A | Result |
|---|---|---|---|
| {l9,l10} | C | S3+G | Valid |
|  | S3+G | C | Valid |
| {l8,l10} | G | S3+C | Failed in the LM test |
|  | S3+C | G | Failed in the LM test |
| {l8,l9} | S3 | C+G | Valid |
|  | C+G | S3 | Valid | nodes, 5 and 6, in FIG. 9, while the two OR nodes are expanded to their AND children, (9,10) and (11,12), respectively. The system then calculates the evaluation function at Node 5, $e_f(\text{Node 5})$, and the evaluation function at Node 6, $e_f(\text{Node 6})$, based on the local costs, $c_f$(Node 5) and $c_f$(Node 6), and the local heuristic estimates, $h_e$(Node 5) and $h_e$(Node 6), as follows:

At Node 5, the system identifies that
1) C is self-stable, but S3+G needs one holding device due to $l_8$.
2) The best assembly pose of S3+G needs one reorientation so that BC+BL+R is on top of G. The assembly pose of the product is initially given in such a way that C is on the right side to BD.
3) C needs one reorientation so that S3+G can be stacked onto C.
4) S3+G+C need to be reoriented after the mating operation of S3+G and C.
5) The manipulability coefficients for S3+G($\gamma_1$), C($\gamma_2$) and S3+G+C($\gamma_3$) are assigned to 0.8, 0.4 and 0.4, respectively, based on Table 3.

Therefore, $$\begin{aligned} c_a(\text{Node5}) &= 15(\text{one holding device}) \\ &+ 10 \times 0.8 + 10 \times 0.4 + 10 \times \\ &\quad 0.4(3 \text{ reorientations}) \\ &+ 1 \times 0.8(\text{stacking operation}) \\ &+ 2(\text{depth of Node 5}) \\ &= 33.8 \end{aligned}$$

For the calculation of the local heuristic estimate at Node 5, the system identifies the following:
1) The estimates of the relative assembly cost due to the directional uniformity, R, and the internal stability, S, of C are zero, since C is a single part.
2) S3+C+G consists of 4 parts with the maximum uniform directionality of 1 in +x. Therefore, $R_0$(S3+C+G)=10×1=10 and $R_s$(S3+C+G)=1×4=4. As a result, the estimate of the relative assembly cost due to the directional uniformity, R, of S3+C+G is 14.
3) S3+C+G has 3 floating liaisons and has the average degree of node of 2. Therefore, the estimate of the relative assembly cost due to the internal stability, S, of S3+C+G is 22.5 (S=15×3/2=22.5) where 15 is used for the relative assembly cost for a holding device.
4) The effect of Node 5 on assembly parallelism, $w_p$, can be estimated as 6 ($w_p$=10×3/5=6 with 10 assigned as a weight).

As a result, we have that $h_e$(Node 5)=42.5. Therefore, we have that $$\begin{aligned} e_f(\text{Node 5}) &= c_a(\text{Node 5}) + \eta h_e(\text{Node 5}) \\ &= 76.3(\text{with } \eta = 1.0). \end{aligned}$$

At Node 6, the system follows the same steps that are used for calculating $e_f$(Node 5), and results are the following:

$c_a$(Node 6)=22.6

Therefore, we have that $$\begin{aligned} e_f(\text{Node 6}) &= c_a(\text{Node 6}) + \eta h_e(\text{Node 6}) \\ &= 54.6(\text{with } \eta = 1.0). \end{aligned}$$

Finally, comparing $e_f$(Node 5) and $e_f$(Node 6), the system selects Node 6 for further expansion. The result of such an expansion is shown in FIG. 9. This process is continued until all nodes become single parts.

Figures 11, 12:
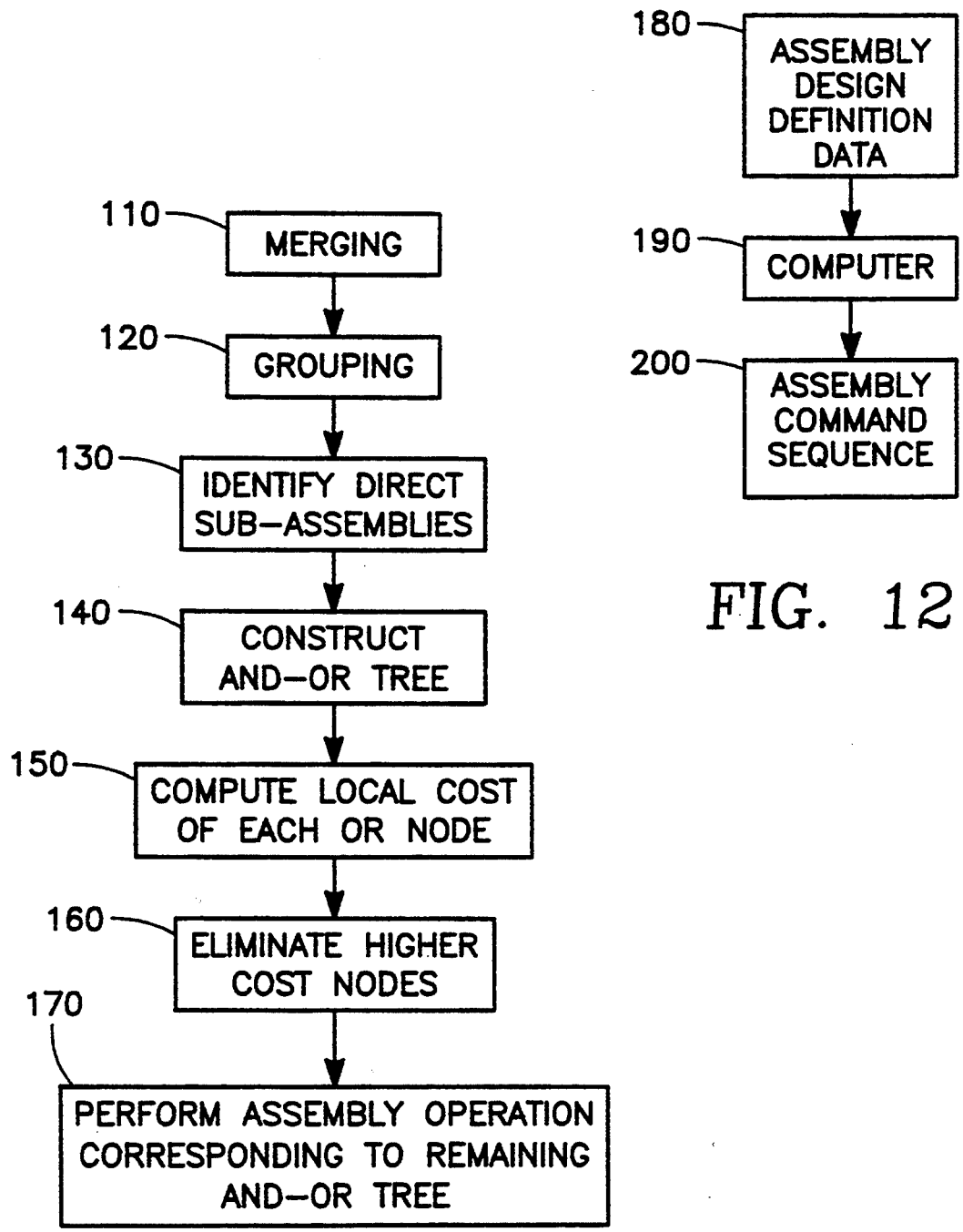
FIG. 11 illustrates the overall process of the invention.
FIG. 12 illustrates a system for carrying out the invention.

FIG. 11 illustrates a process implementing the foregoing, in which the merging process is performed (block 110 of FIG. 11), followed by the grouping process (block 120), both of which reduce the number of potential direct subassemblies which may be identified. All direct subassemblies are identified (block 130). Then, an AND-OR tree is constructed from a knowledge of all direct subassemblies (block 140). The local cost of each OR node is computed (block 150), and the tree is "pruned" to eliminate the higher cost OR nodes (block 160). Finally, an assembly sequence is carried out in accordance with the pruned AND-OR tree.

FIG. 12 illustrates a system for carrying out the invention, including a data base representing the assembly design definitions 180 (such as the liaison graph or map, the assembly constraints and special process constraints), a computer 190 which performs the process of FIG. 11 to generate a sequence of assembly instructions 200.

8 Conclusion

This specification contributes to automatic assembly planning closer to reality by
1) Developing a backward assembly planner which handles the case where an assembly sequence is not the same as the reverse of a disassembly sequence.
2) Improving planning efficiency with the reduction of search space by merging and grouping parts based on interconnection feasibility and special process precedence constraints.
3) Establishing assembly process planning by incorporating such special processes providing as testing, cleaning, etc, in assembly planning.
4) Providing subassembly evaluation criteria with a direct connection to assembly cost: especially the method for the stability and directionality of an assembly is presented through which the required number of holding devices and reorientations during assembly is identified.

While the invention has been described in detail by specific reference to preferred embodiments thereof, it is understood that variations and modifications may be made without departing from the true spirit and scope of the invention.

What is claimed is:

1. A method of selecting and performing a sequence of sub-assembly operations to construct an assembly said assembly containing a plurality of assembly parts, said method comprising:
   identifying all direct subassemblies of said assembly, said identifying comprising:
   (a) identifying potential subassemblies of said assembly,
   (b) for each potential subassembly, determining whether said potential subassembly is a direct subassembly of said assembly by:
      (1) determining whether there is a common axis of separation between said potential subassembly and the remainder of said assembly,
      (2) determining whether said potential subassembly is stable, and
      (3) determining whether there is a direct unobstructed path between said potential subassembly and the remainder of said assembly;
   representing said assembly as a tree of AND and OR nodes beginning with all direct subassemblies as bottom nodes of said tree and concluding with said assembly as the top node of said tree, said AND nodes corresponding to required decompositions of said assembly, said OR nodes corresponding to alternative decompositions of said assembly;

computing a local cost of each OR node of said tree, said computing comprising at least one of the following steps:
(a) determining the number of reorientations of said assembly parts required to construct said direct subassembly given initial orientations of said assembly parts, and
(b) determining the number of mating operations required to construct said direct subassembly;

computing a heuristic cost of each OR node corresponding to said local cost comprising computing a cost of holding said direct subassembly multiplied by a cost of internal stability of said direct subassembly;

combining said local cost and heuristic cost of each OR node of said tree to form a combined cost;

eliminating OR nodes of higher combined costs; and performing an assembly operation of subassemblies corresponding to said tree after the elimination of OR nodes of higher combined costs.

2. The method of claim 1 wherein said identifying potential subassemblies comprises:

identifying all liaisons connecting pairs of nodes of each potential subassembly of said assembly;

for each of said liaisons, merging liaisons for which there is no accessibility for interconnection between said subassembly and said assembly and merging liaisons which have no force-deliverable paths to said assembly.

3. The method of claim 2 further comprising identifying special processes of said assembly of the type comprising testing and cleaning which require certain nodes of said assembly to be processed together during a special process, and wherein said identifying potential subassemblies further comprises:

grouping together nodes of said assembly which must be processed together during special processes of the type comprising cleaning and testing of subassemblies, whereby to prevent identification of potential subassemblies comprising corresponding nodes of said grouping as direct subassemblies.

4. The method of claim 3 further comprising identifying precedent constraints corresponding to required sequences of assembly of parts of said assembly, and wherein said identifying potential subassemblies further comprises:

grouping together nodes of said assembly which must be assembled in a hierarchical sequence corresponding to said precedent constraints, whereby to prevent identification of potential subassemblies comprising corresponding nodes of said hierarchical sequence as direct or subassemblies.

5. The method of claim 4 wherein said determining whether the potential subassembly is stable comprises determining one of:
(a) said potential subassembly has only one translational degree of freedom and only one rotational degree of freedom, said one rotational degree of freedom being about said translational axis only, and
(b) any floating or disconnected liaison of said potential subassembly includes a node of the remainder of said assembly.

6. The method of claim 5 wherein said determining whether said potential subassembly is stable comprises determining said potential subassembly is unstable if either said potential subassembly is unstable or the remainder of said assembly is unstable.

7. The method of claim 1 wherein said internal stability cost comprises a ratio of the number of floating liaisons in said subassembly and the average number of liaisons in said subassembly.

8. A method of selecting and performing a sequence of sub-assembly operations to construct an assembly said assembly containing a plurality of assembly parts, said method comprising:

identifying all direct subassemblies of said assembly, said identifying comprising:
(a) identifying potential subassemblies of said assembly,
(b) for each potential subassembly, determining whether said potential subassembly is a direct subassembly of said assembly by:
(1) determining whether there is a common axis of separation between said potential subassembly and the remainder of said assembly,
(2) determining whether said potential subassembly is stable, and
(3) determining whether there is a direct unobstructed path between said potential subassembly and the remainder of said assembly;

representing said assembly as a tree of AND and OR nodes beginning with all direct subassemblies as bottom nodes of said tree and concluding with said assembly as the top node of said tree, said AND nodes corresponding to required decompositions of said assembly, said OR nodes corresponding to alternative decompositions of said assembly;

computing a local cost of each OR node of said tree, said computing comprising at least: one of the following steps:
(a) determining the number of reorientations of said assembly parts required to construct said direct subassembly given initial orientations of said assembly parts,
(b) determining the number of mating operations required to construct said direct subassembly, and,
(c) determining a relative cost of holding devices to stabilize said direct subassembly and the remainder of said assembly, and determining the relative cost due to reorientation of said assembly parts;

computing a heuristic cost of each OR node corresponding to said local cost comprising computing a cost of holding said direct subassembly multiplied by a cost of internal stability of said direct subassembly;

displaying to an operator a table for each of said OR nodes summarizing all of factors of said local cost and heuristic cost;

combining said local cost and heuristic cost of each OR node of said tree to form a combined cost;

eliminating OR nodes of higher combined costs; and performing an assembly operation of subassemblies corresponding to said tree after the elimination of OR nodes of higher combined costs.

9. The method of claim 8 wherein said identifying potential subassemblies comprises:

identifying all liaisons connecting pairs of nodes of each potential subassembly of said assembly;

for each of said liaisons, merging liaisons for which there is no accessibility for interconnection between said subassembly and said assembly and merging liaisons which have no force deliverable paths to said assembly.

10. The method of claim 9 further comprising identifying special processes of said assembly of the type comprising testing and cleaning which require certain nodes of said assembly to be processed together during a special process, and wherein said identifying potential subassemblies further comprises:

grouping together nodes of said assembly which must be processed together during special processes of the type comprising cleaning and testing of subassemblies, whereby to prevent identification of potential subassemblies comprising corresponding nodes of said grouping as direct subassemblies.

11. The method of claim 10 further comprising identifying precedent constraints corresponding to required sequences of assembly of parts of said assembly, and wherein said identifying potential subassemblies further comprises:

grouping together nodes of said assembly which must be assembled in a hierarchical sequence corresponding to said precedent constraints, whereby to prevent identification of potential subassemblies comprising corresponding nodes of said hierarchical sequence as direct subassemblies.

12. The method of claim 11 wherein said determining whether the potential subassembly is stable comprises determining one of:

(a) said potential subassembly has only one translational degree of freedom and only one rotational degree of freedom, said one rotational degree of freedom being about said translational axis only, and (b) any floating or disconnected liaison of said potential subassembly includes a node of the remainder of said assembly.

13. The method of claim 12 wherein said determining whether said potential subassembly is stable comprises determining said potential subassembly as unstable if either said potential subassembly is unstable or the remainder of said assembly is unstable.

* * * * *